Sept. 11, 1962 L. BOUCHER 3,053,141
NON-INTERMITTENT FILM PROJECTOR
Filed Sept. 23, 1958 4 Sheets-Sheet 1
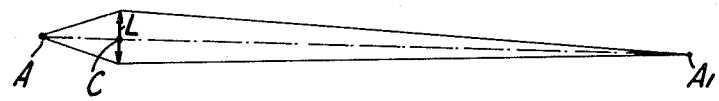
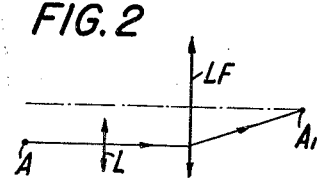
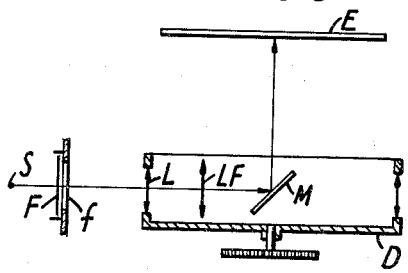
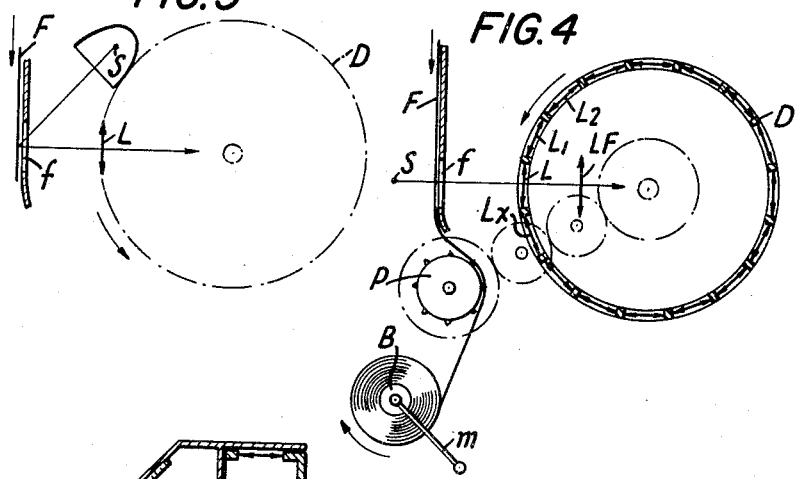
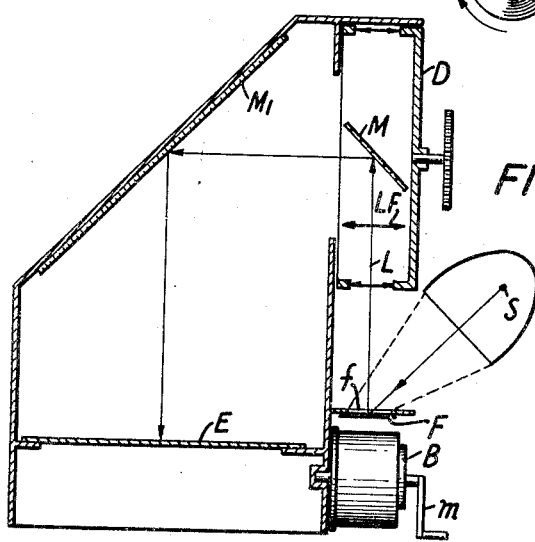
INVENTOR.
LOUIS BOUCHER
BY *Robert E. Burns*
ATTORNEY Sept. 11, 1962   L. BOUCHER   3,053,141
NON-INTERMITTENT FILM PROJECTOR
Filed Sept. 23, 1958   4 Sheets-Sheet 2
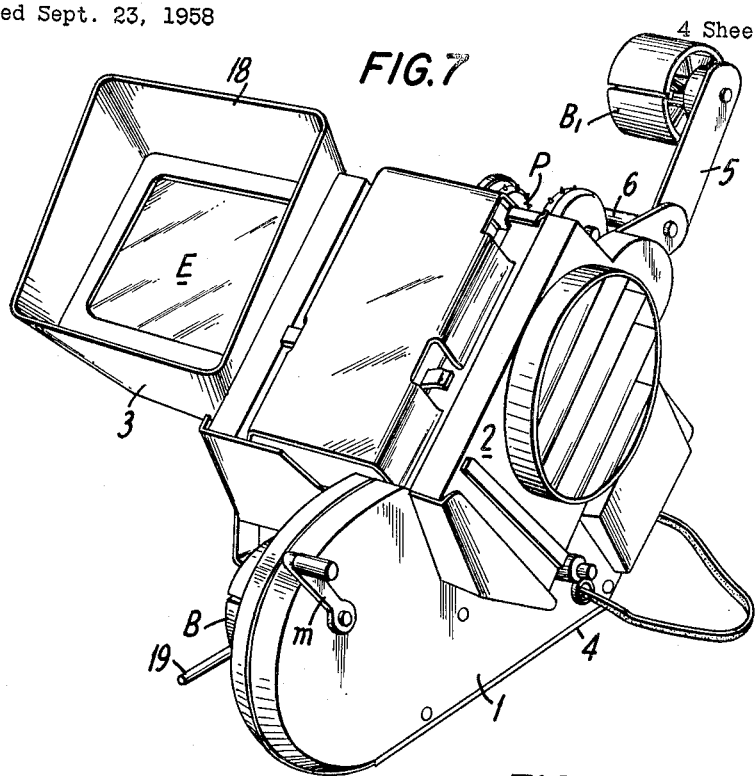
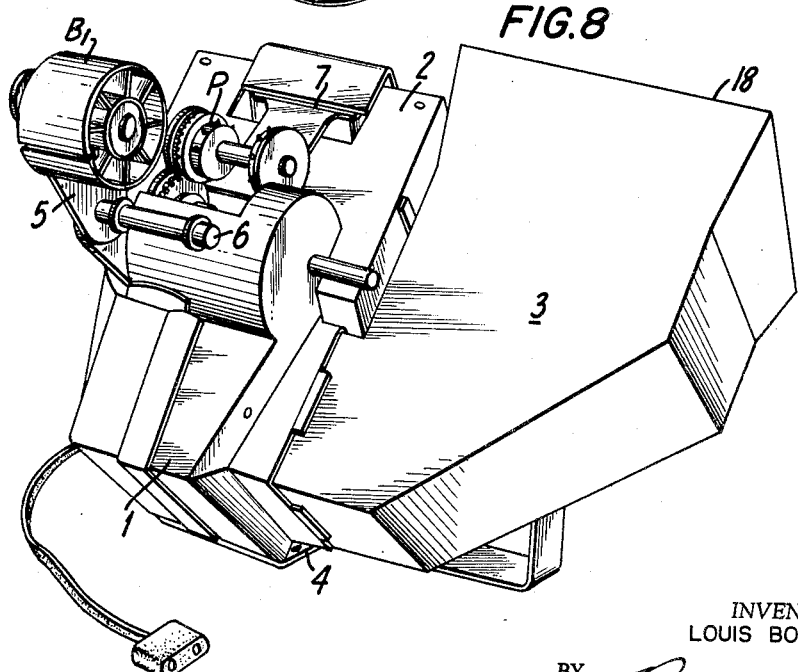
INVENTOR.
LOUIS BOUCHER
BY Robert E. Burns
ATTORNEY

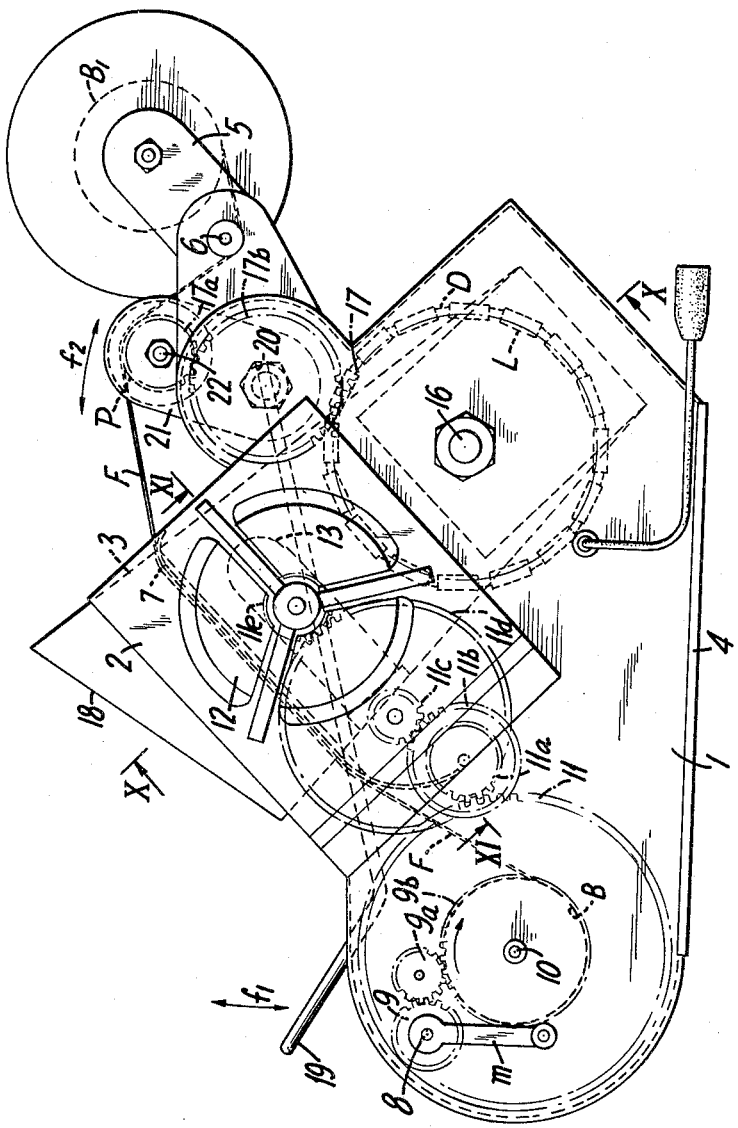

Sept. 11, 1962   L. BOUCHER   3,053,141
NON-INTERMITTENT FILM PROJECTOR
Filed Sept. 23, 1958   4 Sheets-Sheet 4

INVENTOR.
LOUIS BOUCHER
BY
ATTORNEY

United States Patent Office 3,053,141
Patented Sept. 11, 1962

3,053,141
NON-INTERMITTENT FILM PROJECTOR
Louis Boucher, Paris, France, assignor to Lucien Jean, Paris, France
Filed Sept. 23, 1958, Ser. No. 762,866
Claims priority, application France Sept. 26, 1957
4 Claims. (Cl. 88—16.8)

This invention relates in general to film projectors and has particular reference to an improved optical device permitting the projection of a film moving continuously without interrupting the light beam.

This device consists essentially of a practical development of an optical compensation system based on the properties of the optical center of lenses.

In order to afford a clear understanding of this invention and of the manner in which the same may be carried out in the practice, reference will be made to the accompanying drawings forming part of this specification and illustrating diagrammatically by way of example the principle of the invention and a typical form of embodiment thereof.

In the drawings:

FIGURES 1 to 6 are diagrammatical views illustrating the principle on which this invention is based, and FIGURES 7 to 11 are different views showing a practical form of embodiment of the invention.

Referring first to FIG. 1, this diagram shows a cone of light rays having a vertex A which is converted by a lens L into another cone having a vertex $A_1$.

The straight or axis A—$A_1$ passes through the optical center of the lens L without deviation, this optical center being designated by the letter C. If now the assembly consisting of the point A and center C is lowered, for example at the same speed and in parallel directions, the point $A_1$ will be lowered at the same speed and in the same direction.

If, in case the point A were situated in the vicinity of the focal plane of lense L, a large-diameter fixed convergent lens LF were interposed at a suitable location between L and the image plane $A_1$, the focal length of this lens determining the position of the new image plane, and considering the movement set forth in the preceding paragraph, with point A and lens L moving downwards, the image $A_1$ of A in this system would remain fixed on the image plane at the intersection of this image plane with the optical axis of lens LF (FIG. 2). Consequently, there is a fixedness of the image plane of the travelling point A.

Thus, one may imagine in the problem of the continuous projection of a film the ideally accurate theoretical solution consisting in causing a series of lenses mounted for example on a belt or the like, to travel at the same speed and in the same direction in front of a light source, the optical centers of these lenses being of the same relative spacing as the centers of the film images.

The fixed lens LF, which has its optical axis merged into the principal axis of the system, will fix on the screen these successive images which, being framed by a gate aperture corresponding to the dimensions of the film image, are substituted by one another with two fractions of successive images matching or being merged when the two successive views of the film occur simultaneously in front of the series of lenses.

This projector system is therefore alternately monofocal and bifocal, the accurate matching of the two corresponding portions of two successive images being ensured by the fixed lens LF.

However, a mechanical construction based strictly on this principle would obviously be extremely difficult and costly to carry out.

In the apparatus according to this invention a circular motion of the lenses is substituted for the aforesaid rectilinear motion. Under these conditions, the lenses may be secured conveniently and accurately on a drum having an open flange through which a fixed mirror set at 45° may reflect the light rays in the direction of the fixed lens LF and therefore onto the screen. This drum is operatively connected with the proper timing to the film driving means.

This drum may advantageously have a diameter sufficient to prevent the angle formed between two adjacent lenses from exceeding a certain limit. Experience teaches that a diameter of less than 4" may be used, so that projectors of relatively reduced over-all dimensions may be constructed. However, the greater the diameter, the better the resulting image.

In order properly to frame the image, the optical axes of the lenses and the centers of the film pictures are caused to register with one another, for example by using a freewheel device mounted on the shaft of the rotary drum. FIG. 3 shows a diagrammatic axial section of an apparatus of this character.

Referring now to FIGS. 1 to 6 of the drawings, S is the light source, F the film, f the film framing aperture, L, $L_1$, $L_2$ . . . $L_x$ the lenses fitted on the optical rotary drum, M the mirror set at 45°, LF the fixed lens, E the projection screen, P the film driving sprocket, B the film take-up spool, and m the crank handle for operating the take-up spool.

FIG. 4 shows the device in diagrammatic side view. The sprocket P is operatively connected through a train of gears to the drum D, whereby the film and the drum-carried lenses will move in synchronism and in the same direction past the last ray issuing from the light source S. This mechanical connection is shown only diagrammatically in order to clarify the illustration, it being understood that any suitable and known means may be used to ensure the proper timing between the film motion and the drum rotation.

The main advantage of the continuous-motion system is that films of relatively low mechanical strength may be used. Thus, films made of the most economical materials, for example paper, may be used. Under these conditions and in combination with an episcopic illumination system, films printed on both sides may be used, so that the projection time of a given film may be doubled. As the system is of compensation and optical character, the lens power may be selected to provide between the optical system and the film a gap sufficient to permit the insertion of one or more light sources illuminating the film, for example as shown in FIG. 5. Thus, two projectors may be arranged symmetrically in the vertical or in the horizontal plane, or concurrently in several planes.

Another advantage offered by the continuous film motion without light beam interruption according to this invention is that it provides a united movement of the images from a rate of five images per second upwards. In fact, the phenomenon of the persistence of vision is not utilized in this system, as an image is permanently formed on the observer's retina.

With a film providing the most advantageous form of embodiment, that is, printed on both sides, and a rate of five images per second, the time of projection is increased six times in comparison with a transparent film projected in a conventional-type intermittent system at the normal rate of sixteen images per second.

In one of its forms of embodiment which is particularly advantageous when adapted to the construction of an individual toy, the apparatus according to this invention is characterized by the provision of another mirror $M_1$ set at 45° (see FIG. 6) and adapted to reflect the image onto a frosted screen E protected by a shade, this assembly being mounted in a casing or cabinet. Thus, a portable apparatus of relatively small over-all dimensions may be constructed which has all the advantages of a self-contained unit. In this specific form of embodiment the film take-up spool may be driven in the winding direction in a simple manenr, for example by means of a direct-drive crank handle m mounted on this spool. Then the operator adjusts the film speed to that convenient or required. Thus, the film, due to the engagement of its perforations on the sprocket teeth, rotating with the proper timing relative to the optical system, acts as a driving belt.

FIGS. 7 to 11 of the drawings illustrate a typical mechanical embodiment of a projector constructed according to the teachings of this invention.

FIG. 7 is a perspective view showing the projector as seen from the screen side.

FIG. 8 is a perspective view from beneath of the same apparatus.

FIG. 9 is a side elevational view, and

FIGS. 10 and 11 are cross sections taken upon the lines X—X and XI—XI of FIG. 9, respectively.

This projector comprises a casing 1 containing the film-driving mechanism and the optical system, a lantern 2, a screen-carrying case 3, and a base plate 4 supporting the assembly.

The film F is payed off from a feed spool $B_1$ carried by a swivel arm 5 and passes under a guide roller 6 as well as over a sprocket P disposed in advance of the gate 7; at the lower end of this gate the film is received by a take-up spool B.

The film F is driven by means of a crank handle m; the shaft 8 of this crank handle has keyed or otherwise secured thereon a pinion 9 (FIG. 9) meshing with another pinion 9a meshing in turn with a reducing pinion 9b keyed on the shaft 10 of the take up spool B.

In addition to the driving of the film F, the crank handle m drives through the intermediary of a large-diameter toothed wheel 11 and a train of step-up gears 11a—11b . . . 11e the device for cooling the lantern 2, which consists of a pair of turbines 12 mounted on the shafts of pinions 11e, as shown in FIG. 11.

A pair of lamps 13 equipped with reflectors 14 are arranged on either side of the optical axis and register with the framing aperture f of gate 7.

Mounted for rotation in the casing 1 is a drum D carrying on one flange 15 a shaft 16 on which a toothed wheel 17 is keyed. The rotational motion of this drum D is synchronized with the unwinding or travel of the film F; to this end, the sprocket P is operatively connected through a train of gears 17a—17b with the toothed wheel 17 solid with the drum D.

The cylindrical skirt of the drum carries an adequate number of spaced lenses L suitably arranged and therefore adapted to move past the framing aperture f in proper timed relationship to the rectilinear displacement of the film.

Inside the drum and in fixed relationship thereto are mounted on the optical axis a fixed lens LF and a mirror M set at 45° to this axis and adapted to reflect the successive images of the film onto another mirror $M_1$ set at 45° to the axis of reflection of the mirror M for reflecting the image in turn on a frosted or ground screen E provided with a shade 18 forming the extension of the casing 3.

The film F may be framed very simply by actuating a lever 19 the inner end 20 of which causes an angular displacement in the direction of the arrow $f_2$ of a flange 21 having mounted thereon the shaft 22 of the sprocket P; by moving this sprocket P towards or away from the film gate 7 the framing adjustment may be carried out when the film is still or when it is being driven continuously.

This apparatus is designed for projecting films on screens of relatively moderate sizes. This is due to its very principle. As a matter of fact, the beam issuing from the lens L and forming the image must be small enough to strike only a reduced fraction of the surface of lens LF, so that this fraction will be received completely by this lens during a relatively substantial angular movement of the optical system.

The brightness of the projection may be doubled by projecting films wherein two successive images are identical through an aperture having twice the height of a single image. In this case these identical images are superposed and followed by two successive vertical images differing from those of the preceding pair, thus providing a flexibly united movement. Besides, every other image may be replaced by a black surface of the same magnitude, which corresponds to the optical suppression of this image. In this case, the distance between the centers of two successive images is doubled. On the other hand, it is also possible without departing from the principle of this invention to double the lens aperture. Furthermore, with the principle of the invention it is possible to construct a camera giving images of relatively large dimensions, notably vertically or longitudinally of the film.

It will readily occur to anybody conversant with the art that in the case of a projection at the rate of five images per second the film to be projected must be taken at the same speed.

In addition, many modifications and alterations may be brought to the forms of embodiment shown and described herein without departing from the spirit and scope of the invention as set forth in the appended claims.

What I claim is:

1. In a film projector for projecting a motion picture film to a screen, a light source, means for causing the film to travel at a continuous speed in front of said light source, a drum mounted for rotation in front of the portion of said film illuminated by said light source, said drum being effective to rotate simultaneously with the movement of said film and in the same direction, and means for rotatably driving said drum at a peripheral speed equal to the linear speed of said film, a plurality of object-lenses mounted in the peripheral portion of said drum, whereby the rate of movement of said lenses upon rotation of said drum is equal to the rate of movement of said film, means for adjusting at will the relative timing of said film and said drum for positioning the center of a film frame on the optical axis of each object-lens when the latter moves past the film, a fixed projection lens mounted within said drum for projection of the moving image, and a mirror mounted in said drum in the area of the axis thereof and positioned to reflect axially the light beam from the illuminated portion of the film, said lens being mounted between the periphery of said drum and said mirror, said film moving in the focal plane of said plurality of lenses, and said projection lens having a focus located directly on said screen.

2. An apparatus for projecting a motion picture film on a screen as set forth in claim 1, wherein the film driving means consists of a rotatably driven film winding drum, said means for rotatably driving said drum at a peripheral speed equal to the linear speed of the film consisting of a sprocket wheel rotatably driven from said film and a positive rotational drive between said sprocket wheel and said drum, and said means for adjusting the relative timing between said film and said drum consisting of a lever adapted with one end to cause the angular displacement of a flange having mounted thereon the shaft of said sprocket wheel.

3. In a film projector for projecting a motion picture film to a screen, a light source, means for causing the film to travel at a continuous speed in front of said light source, a drum mounted for rotation in front of the portion of said film illuminated by said light source, said drum being effective to rotate simultaneously with the movement of said film and in the same direction, and means for rotatably driving said drum at a peripheral speed equal to the linear speed of said film, a plurality of object-lenses mounted in the peripheral portion of said drum, whereby the rate of movement of said lenses upon rotation of said drum is equal to the rate of movement of said film, a fixed projection lens mounted within said drum for projection of the moving image, and a mirror mounted in said drum in the area of the axis thereof and positioned to reflect axially the light beam from the illuminated portion of the film, said lens being mounted between the periphery of said drum and said mirror, said film moving in the focal plane of said plurality of lenses, and said projection lens having a focus located directly on said screen.

4. In a film projector for projecting a motion picture film to screen, a light source, means for causing the film to travel at a continuous speed in front of said light source, a drum mounted for rotation in front of the portion of said film illuminated by said light source, said drum being effective to rotate simultaneously with the movement of said film and in the same direction, and means for rotatably driving said drum at a peripheral speed equal to the linear speed of said film, a plurality of converging miniscus lenses mounted in the peripheral portion of said drum for rotation with their concavity facing the interior of said drum, whereby the rate of movement of said lenses upon rotation of said drum is equal to the rate of movement of said film, a fixed converging miniscus projection lens mounted within said drum with its concavity facing the periphery of said drum for projection of the moving image, said projection lens being spaced from said drum periphery and from the plurality of lenses in the direction of said film by a distance which is less than the radius of said drum, and a mirror mounted in said drum in the area of the axis thereof and positioned to reflect axially the light beam from the illuminated portion of the film, said lens being mounted between the periphery of said drum and said mirror, said film moving in the focal plane of said plurality of lenses and said projection lens having a focus located directly on said screen.

References Cited in the file of this patent

UNITED STATES PATENTS

| | | |
|---|---|---|
| 1,127,155 | Anderson | Feb. 2, 1915 |
| 1,317,450 | Momyer | Sept. 30, 1919 |
| 1,749,026 | Gentilini | Mar. 4, 1930 |
| 1,827,011 | Kohlmeyer | Oct. 13, 1931 |
| 1,957,457 | Holman | May 8, 1934 |
| 2,013,661 | Leventhal | Sept. 10, 1935 |
| 2,298,045 | Ehrenhaft | Oct. 6, 1942 |

FOREIGN PATENTS

| | | |
|---|---|---|
| 393,257 | Great Britain | 1933 |